(12) United States Patent (10) Patent No.: US 11,761,767 B2
Lin et al. (45) Date of Patent: Sep. 19, 2023

(54) METHOD, DEVICE, APPARATUS, AND APPLICATION FOR CLOUD-BASED TRAJECTORY MAP GENERATION

(71) Applicant: CloudMinds (Shanghai) Robotics Co., Ltd., Shanghai (CN)

(72) Inventors: Yimin Lin, Shenzhen (CN); Shiguo Lian, Shenzhen (CN)

(73) Assignee: CLOUDMINDS ROBOTICS CO., LTD., Shanghai (CN)

( * ) Notice: Subject to any disclaimer, the term of this patent is extended or adjusted under 35 U.S.C. 154(b) by 515 days.

(21) Appl. No.: 16/609,445

(22) PCT Filed: Feb. 26, 2018

(86) PCT No.: PCT/CN2017/119972
§ 371 (c)(1),
(2) Date: Oct. 29, 2019

(87) PCT Pub. No.: WO2019/161517
PCT Pub. Date: Aug. 29, 2019

(65) Prior Publication Data
US 2020/0088520 A1 Mar. 19, 2020

(51) Int. Cl.
*G01C 21/00* (2006.01)
*G01C 21/20* (2006.01)
(Continued)

(52) U.S. Cl.
CPC .......... *G01C 21/005* (2013.01); *G01C 21/20* (2013.01); *G05D 1/0022* (2013.01); *G05D 1/0274* (2013.01)

(58) Field of Classification Search
CPC .... G01C 21/005; G01C 21/20; G05D 1/0022; G05D 1/0274
See application file for complete search history.

(56) References Cited

U.S. PATENT DOCUMENTS 10,222,211 B2 * 3/2019 Chen .................. G05D 1/0088
2007/0239326 A1 * 10/2007 Johnson .................. G01C 5/06
701/9
(Continued)

FOREIGN PATENT DOCUMENTS

CN 101488184 A 7/2009
CN 104236556 A 12/2014
(Continued)

OTHER PUBLICATIONS

A. Kasyanov, F. Engelmann, J. Stückler and B. Leibe, "Keyframe-based visual-inertial online SLAM with relocalization," 2017 IEEE/RSJ International Conference on Intelligent Robots and Systems (IROS), 2017, pp. 6662-6669, doi: 10.1109/IROS.2017.8206581. (Year: 2017).*

(Continued)

*Primary Examiner* — Maceeh Anwari
(74) *Attorney, Agent, or Firm* — McCoy Russell LLP

(57) ABSTRACT

A cloud-based trajectory map generation method, device, apparatus and application. The method includes: acquiring first trajectory map data and second trajectory map data; performing a map-initializing treatment to align the two trajectory map data to obtain an initial value of a transformation relationship therebetween; interpolating the two trajectory map data to obtain corresponding data at preset interpolation points thereto; determining a residual equation based on the corresponding data at the preset interpolation points and the initial value of the transformation relationship to obtain an optimal solution of the transformation relationship based thereon; and generating a trajectory map based on the optimal solution of the transformation relationship. The trajectory map data are obtained using two different mapping schemes over a same moving trajectory, or using a same mapping scheme over two substantially identical mov- (Continued)

ing trajectories, within a same region, which are optimized to thereby obtain a high-precision trajectory map.

20 Claims, 6 Drawing Sheets

(51) Int. Cl.
*G05D 1/00* (2006.01)
*G05D 1/02* (2020.01)

(56) References Cited

U.S. PATENT DOCUMENTS

| | | | |
|---|---|---|---|
| 2013/0208943 A1 | 8/2013 | Chuang | |
| 2014/0323148 A1* | 10/2014 | Schmalstieg | G01C 21/20 455/456.1 |
| 2015/0379766 A1* | 12/2015 | Newman | G06T 7/246 356/5.01 |
| 2017/0168498 A1* | 6/2017 | Nakajima | G05D 1/0088 |
| 2017/0314938 A1 | 11/2017 | Wang et al. | |
| 2017/0337749 A1* | 11/2017 | Nerurkar | G06F 3/038 |
| 2017/0339396 A1* | 11/2017 | Zhang | H04N 13/111 |
| 2017/0357858 A1* | 12/2017 | Mendonca | G06K 9/00791 |
| 2018/0188027 A1* | 7/2018 | Zhang | G06T 7/74 |
| 2018/0188381 A1* | 7/2018 | Zhang | H04W 4/021 |
| 2018/0209802 A1* | 7/2018 | Jung | G01C 21/3415 |
| 2018/0340788 A1* | 11/2018 | Liu | G01C 21/28 |
| 2019/0003836 A1* | 1/2019 | Zhang | G01S 17/86 |
| 2019/0049566 A1* | 2/2019 | Adams | G01S 7/4972 |
| 2019/0094883 A1* | 3/2019 | Lee | G01S 19/393 |
| 2019/0301873 A1* | 10/2019 | Prasser | G01C 21/32 |
| 2020/0263996 A1* | 8/2020 | Gokhale | G01S 17/89 |
| 2020/0363806 A1* | 11/2020 | Kobilarov | G05D 1/0088 |

FOREIGN PATENT DOCUMENTS

| | | |
|---|---|---|
| CN | 105143821 A | 12/2015 |
| CN | 105403222 A | 3/2016 |
| CN | 106127739 A | 11/2016 |
| CN | 107402014 A | 11/2017 |
| WO | 2016068807 A1 | 5/2016 |
| WO | WO-2019018315 A1 * | 1/2019 ........... G01C 21/165 |

OTHER PUBLICATIONS

X. Jiang, T. Li and Y. Yu, "A novel SLAM algorithm with Adaptive Kalman filter," 2016 International Conference on Advanced Robotics and Mechatronics (ICARM), 2016, pp. 107-111, doi: 10.1109/ICARM.2016.7606903. (Year: 2016) :selected:.*

D.-x. Zhu, "Binocular Vision-SLAM Using Improved SIFT Algorithm," 2010 2nd International Workshop on Intelligent Systems and Applications, 2010, pp. 1-4, doi: 10.1109/IWISA.2010.5473273. (Year: 2010).*

C. Joochim and H. Roth, "The indoor SLAM using multiple three dimension sensors integration," 2009 IEEE International Workshop on Intelligent Data Acquisition and Advanced Computing Systems: Technology and Applications, 2009, pp. 500-504, doi: 10.1109/IDAACS.2009.5342931. (Year: 2009).*

International Search Report in the international application No. PCT/CN2017/119972, dated Sep. 20, 2018.

Written Opinion of the International Search Authority in the international application No. PCT/CN2017/119972, dated Sep. 20, 2018.

First Office Action of the Chinese application No. 201780002712.9, dated Sep. 30, 2020.

* cited by examiner

METHOD, DEVICE, APPARATUS, AND APPLICATION FOR CLOUD-BASED TRAJECTORY MAP GENERATION

CROSS-REFERENCE TO RELATED APPLICATIONS

The present application is a national stage entry application of international application number PCT/CN2017/119972 filed on Feb. 26, 2018, the disclosure of which is hereby incorporated by reference in its entirety.

TECHNICAL FIELD

The present disclosure relates to the field of map optimization technologies, which can be applied to cloud-based robots, and can be further applied to the field of obstacle avoidance and/or blindness guidance of robots and unmanned aerial vehicles (UAV). In particular, the present disclosure relates to a cloud-based trajectory map generation method, device, apparatus, and application program.

BACKGROUND

A cloud-based robot is an intelligent robot having its cognitive system in the cloud, while having its body, driving mechanisms, and sensors into the body of the robot, which are communicatively connected with each other through mobile communications. The cloud-based robots are a direction of development for intelligent humanoid robots.

Simultaneous localization and mapping (SLAM) is a technology whereby robots, autopilot vehicles or alike, can build maps in an unknown environment (i.e. provided with no prior knowledge), or can update maps in a known environment (i.e. provided with prior knowledge). As such, it ensures that these devices can track their current locations at the same time.

With the development of high-performance processors and multi-threaded architecture, the vision-based real-time positioning and mapping technology once again emerges internationally in the forefront of academics. The field of vision-based SLAM can usually be divided, from the front-end of vision, into a feature-based scheme and a direct method-based scheme; or can be divided, from the back-end optimization, into a filter-based scheme and an optimization-based scheme; or can be divided, according to the sensors used, into a monocular SLAM scheme, a binocular SLAM scheme, and a Visual-Inertial Odometry (VIO) scheme, etc. Among these different schemes, the monocular SLAM scheme is unable to obtain a real-scale map due to the lack of a fixed scale, and it is further prone to issues such as scale drift. Due to the limitation of baseline length, the binocular SLAM scheme is difficult to derive a high-precision map in an outdoor and large-depth scene.

In order to get high-precision maps with real scales, it is relatively easy to think of an approach that uses multiple SLAM schemes, or runs the same SLAM scheme multiple times, to thereby get a trajectory map for a same region, and then to get a higher-precision map by means of corresponding algorithms to reduce errors. However, due to the randomness of feature points and key frames, and to the difference of timestamp systems, the final map thus obtained is only roughly similar in the outlines, leading to a difficulty to achieve data synchronization in all details.

All existing schemes can produce trajectory maps, but because of the characteristics and limitations of these various methods, there are many shortcomings in the trajectory maps obtained thereby.

SUMMARY

In view of the shortcomings of existing trajectory map generation schemes, the present disclosure provides a cloud-based trajectory map generation method, a cloud-based trajectory map generation device, a cloud-based trajectory map generation apparatus, and a cloud-based trajectory map generation application program.

In a first aspect, embodiments of the disclosure provide a cloud-based trajectory map generation method. The method includes the following steps:

acquiring first trajectory map data and second trajectory map data, wherein the first trajectory map data and the second trajectory map data are obtained using two different mapping schemes over a same moving trajectory or using a same mapping scheme over two substantially same moving trajectories within a same region;

performing a map-initializing treatment to align the first trajectory map data and the second trajectory map data to thereby obtain an initial value of a transformation relationship therebetween (i.e. between the first trajectory map data and the second trajectory map data);

interpolating the first trajectory map data and the second trajectory map data to thereby obtain data at preset interpolation points corresponding to the first trajectory map data and the second trajectory map data (i.e. corresponding interpolation point data);

determining a residual equation based on the corresponding interpolation point data and the initial value of the transformation relationship, and obtaining an optimal solution of the transformation relationship based on the residual equation; and generating a trajectory map based on the optimal solution of the transformation relationship.

In a second aspect, embodiments of the disclosure further provide a cloud-based trajectory map generation device. The device comprises:

an acquisition module, configured to acquire first trajectory map data and second trajectory map data, wherein the first trajectory map data and the second trajectory map data are obtained using two different mapping schemes over a same moving trajectory, or using a same mapping scheme over two substantially same moving trajectories, within a same region;

an initialization module, configured to perform a map-initializing treatment to align the first trajectory map data and the second trajectory map data to thereby obtain an initial value of a transformation relationship therebetween;

an interpolation module, configured to interpolate the first trajectory map data and the second trajectory map data to thereby obtain data at preset interpolation points corresponding to the first trajectory map data and the second trajectory map data (i.e. corresponding interpolation point data);

an optimization module, configured to determine a residual equation based on the corresponding interpolation point data and the initial value of the transformation relationship, and to obtain an optimal solution of the transformation relationship based on the residual equation; and a generation module, configured to generate a trajectory map based on the optimal solution of the transformation relationship.

In a third aspect, embodiments of the disclosure further provide a cloud-based trajectory map generation apparatus. The apparatus comprises a communication module, a storage, one or more processors, and one or more modules. Each of the one or more modules is stored in the storage, and is configured to be executed by the one or more processors. Each of the one or more modules comprises instructions configured to execute the steps of the method as provided in the first aspect of the disclosure.

In a fourth aspect, embodiments of the disclosure further provide a cloud-based trajectory map generation application that is used in combination with the cloud-based trajectory map generation apparatus as described above. The application comprises a computer program embedded in a computer-readable storage medium, and the computer program comprises instructions configured to execute the steps of the method as provided in the first aspect of the disclosure.

The benefits of the above-mentioned cloud-based trajectory map generation method, device, apparatus and application include the following.

In order to address the shortcomings of existing trajectory map generation schemes, embodiments of the disclosure provide a cloud-based trajectory map generation method. The method includes: acquiring first trajectory map data and second trajectory map data, wherein the first trajectory map data and the second trajectory map data are obtained using two different mapping schemes over a same moving trajectory or using a same mapping scheme over two substantially identical moving trajectories within a same region; performing a map-initializing treatment to align the first trajectory map data and the second trajectory map data to thereby obtain an initial value of a transformation relationship between the first trajectory map data and the second trajectory map data; interpolating the first trajectory map data and the second trajectory map data to thereby obtain data at preset interpolation points corresponding to the first trajectory map data and the second trajectory map data (i.e. corresponding interpolation point data); determining a residual equation based on the corresponding interpolation point data and the initial value of the transformation relationship, and obtaining an optimal solution of the transformation relationship based on the residual equation; and generating a trajectory map based on the optimal solution of the transformation relationship. The trajectory map data are obtained using two different mapping schemes over a same moving trajectory or using a same mapping scheme over two substantially identical moving trajectories within a same region, which are optimized to thereby obtain a high-precision trajectory map.

DETAILED DESCRIPTION

In order to make the technical solution provided in the disclosure and the advantages thereof clearer, in the following a detailed description is further provided for some illustrating embodiments which are accompanied with drawings. It is obvious that the embodiments described herein represent only part of, and do not exhaustively cover all of, the embodiments of this disclosure. In situations where no conflict exists, features of the embodiments in the present disclosure can be combined with one another.

Figure 1:
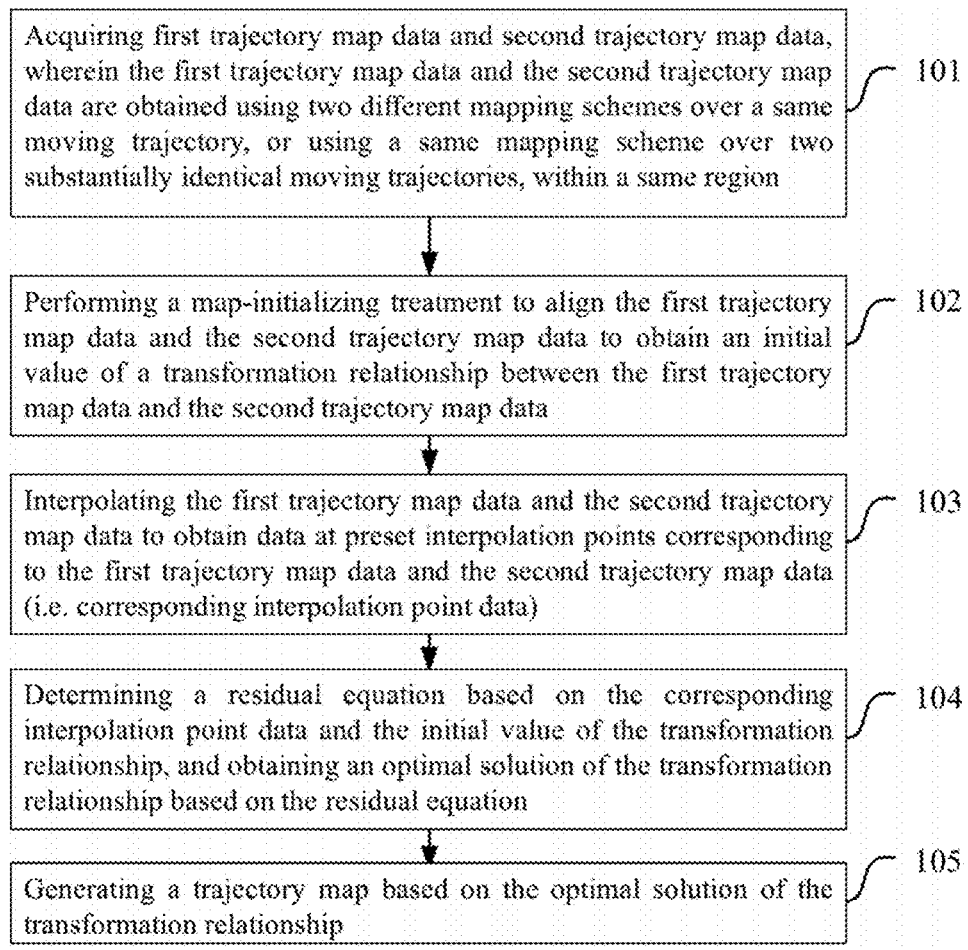
FIG. 1 illustrates a flow chart of a cloud-based trajectory map generation method provided by embodiments of the disclosure.

FIG. 1 illustrates a flow chart of a cloud-based trajectory map generation method provided by some embodiments of the disclosure. As shown in FIG. 1, the cloud-based trajectory map generation method includes the following steps:

Step 101: acquiring first trajectory map data and second trajectory map data, wherein the first trajectory map data and the second trajectory map data are obtained using two different mapping schemes over a same moving trajectory or using a same mapping scheme over two substantially identical moving trajectories within a same region;

Step 102: performing a map-initializing treatment to align the first trajectory map data and the second trajectory map data to thereby obtain an initial value of a transformation relationship between the first trajectory map data and the second trajectory map data;

Step 103: interpolating the first trajectory map data and the second trajectory map data to thereby obtain data at preset interpolation points corresponding to the first trajectory map data and the second trajectory map data (i.e. corresponding interpolation point data);

Step 104: determining a residual equation based on the corresponding interpolation point data and the initial value of the transformation relationship, and obtaining an optimal solution of the transformation relationship based on the residual equation; and Step 105: generating a trajectory map based on the optimal solution of the transformation relationship.

In practice or implementation, the method as described above can be realized by means of a data acquisition device in a cloud-based robot (or another apparatus) to collect the trajectory map data; then the collected trajectory map data can be uploaded to a corresponding cloud-based server for subsequent processing of the trajectory map data to thereby ultimately generate a high-precision trajectory map. In situations where a device or terminal collecting the trajectory map data has data processing capability, the device or terminal can also process the data and generate the trajectory map.

Optionally, any two of mapping schemes, including vision-processing schemes, such as the monocular SLAM scheme, the binocular SLAM scheme, the fisheye scheme, and the VIO scheme, or other trajectory mapping schemes, can be used over a same moving trajectory within a same region to respectively collect the trajectory map data (i.e. the first trajectory map data and the second trajectory map data). Alternatively, a same mapping scheme can be used over two same moving trajectories within a same region to collect the first trajectory map data and the second trajectory map data.

Then a map-initializing treatment can be performed to align the first trajectory map data and the second trajectory map data to thereby obtain an initial value of a transformation relationship between the first trajectory map data and the second trajectory map data.

In order to ensure that the first trajectory map data and the second trajectory map data can correspond well in subsequent data processing, it is required to interpolate the first trajectory map data and the second trajectory map data to thereby obtain data at preset interpolation points corresponding to the first trajectory map data and the second trajectory map data. The data at preset interpolation points corresponding to the first trajectory map data and the second trajectory map data may be referred to as the interpolation point data corresponding to the two trajectory map data (i.e. the first trajectory map data and the second trajectory map data) at a same time. In the specific interpolation process, the numbers of the interpolation points corresponding respectively to the first trajectory map data and to the second trajectory map data after the final interpolation processing do not necessarily have to be the same. It is only required to ensure that there are data for a certain number of interpolation points corresponding both to the first trajectory map data and the second trajectory map data at a same time.

Based on the interpolation point data corresponding (at a same time) to the first trajectory map data and the second trajectory map data and the initial value of the transformation relationship, a residual equation can be determined, which can then be used to calculate an optimal solution of the transformation relationship between the first trajectory map data and the second trajectory map data. Then based on the first trajectory map data and the second trajectory map data, and further on the optimal solution of the transformation relationship, a trajectory map can be generated. The preferred solution for generating the trajectory map will be described in detail in the following sections of the disclosure.

In implementation, in order to optimize the generation of the trajectory map more sufficiently, more trajectory map data can be utilized to participate in the optimization of cloud-based trajectory map generation. It will be explained in detail in the following sections.

It is noted that the executions of steps 102 and 103 may not be in any particular order, and their executions can alternatively be in a simultaneous manner.

In order to address the shortcomings of existing trajectory map generation schemes, embodiments of the disclosure provide a cloud-based trajectory map generation method. The method includes: acquiring first trajectory map data and second trajectory map data, wherein the first trajectory map data and the second trajectory map data are obtained using two different mapping schemes over a same moving trajectory or using a same mapping scheme over two substantially identical moving trajectories within a same region; performing a map-initializing treatment to align the first trajectory map data and the second trajectory map data to thereby obtain an initial value of a transformation relationship between the first trajectory map data and the second trajectory map data; interpolating the first trajectory map data and the second trajectory map data to thereby obtain data at preset interpolation points corresponding to the first trajectory map data and the second trajectory map data (i.e. corresponding interpolation point data); determining a residual equation based on the corresponding interpolation point data and the initial value of the transformation relationship, and obtaining an optimal solution of the transformation relationship based on the residual equation; and generating a trajectory map based on the optimal solution of the transformation relationship. The trajectory map data are obtained using two different mapping schemes over a same moving trajectory or using a same mapping scheme over two substantially identical moving trajectories within a same region, which are optimized to thereby obtain a high-precision trajectory map.

The above step of performing a map-initializing treatment to align the first trajectory map data and the second trajectory map data to thereby obtain an initial value of a transformation relationship between the first trajectory map data and the second trajectory map data can include:

obtaining data corresponding to at least two preset position points from each of the first trajectory map data and the second trajectory map data;

obtaining a relative initial translation vector of the first trajectory map data and the second trajectory map data based on any one of the at least two position points;

drawing connection lines connecting two of the at least two position points;

obtaining a relative scaling factor for the first trajectory map data and the second trajectory map data based on a length ratio between the connection line corresponding to the first trajectory map data and the connection line corresponding to the second trajectory map data;

obtaining a similarity transformation matrix for the first trajectory map data and the second trajectory map data based on an angle between the connection lines.

Herein, the transformation relationship includes a relative scaling factor, a relative initial translation vector, or a similarity transformation matrix.

Figure 4:
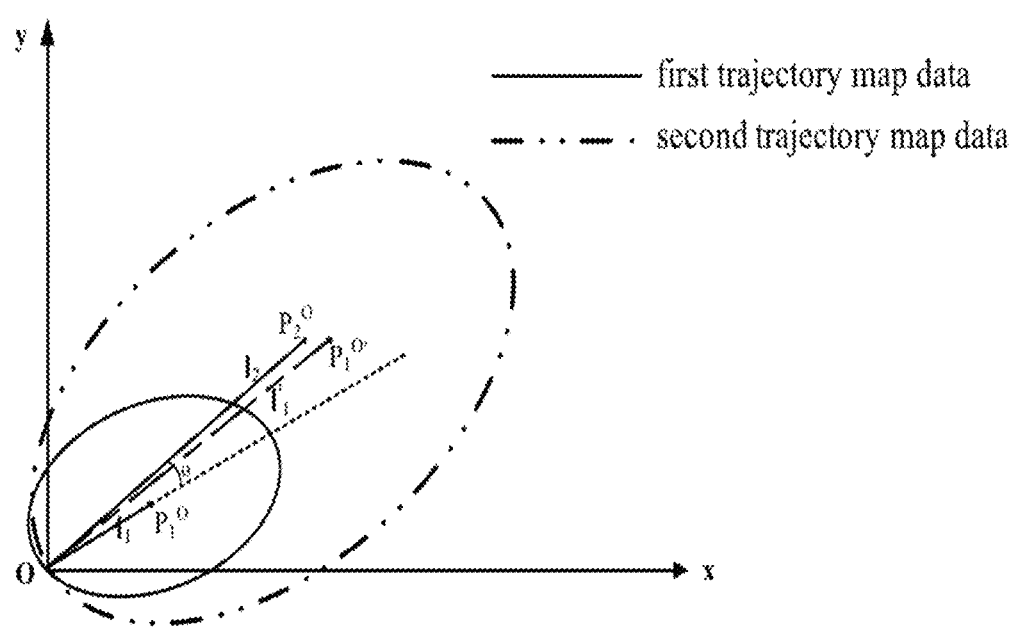
FIG. 4 is a first diagram illustrating a cloud-based trajectory map generation method according to some embodiments of the disclosure.

FIG. 4 is a first diagram illustrating a cloud-based trajectory map generation method according to some embodiments of the disclosure. As shown in FIG. 4, the solid line constitutes the first trajectory map data, and the broken line comprising points and lines constitutes the second trajectory map data. The origins of the two trajectory map data coincide at O. The centroid points of the two trajectory map data are $P_1^o$ and $P_2^o$, respectively.

As shown in FIG. 4, after the initializing treatment to thereby align the first trajectory map data and the second trajectory map data, the origins of the two trajectory map data coincide. Herein, when obtaining data corresponding to at least two preset position points from each of the first trajectory map data and the second trajectory map data, the data at two position points, i.e. the origin O and centroid points $P_1^o$ and $P_2^o$, are selected. In practice, two pairs of position points that correspond respectively to the first trajectory map data and the second trajectory map data can be selected. In order to more accurately obtain the initial value of the transformation relationship between the first trajectory map data and the second trajectory map data, multiple pairs of position points can optionally be selected. Position points other than the origin or the centroid points can optionally be selected. There are no restrictions herein.

In the initializing treatment for alignment, the relative translation vector obtained by overlapping their origins (or by overlapping positions points other than the origins) is the relative initial translation vector for the first trajectory map data and the second trajectory map data.

Connection lines $l_1$ and $l_2$ are obtained by connecting the origin and the centroid point corresponding to the first and second trajectory map data, respectively. The length ratio of $l_1$ and $l_2$ is the relative scaling factor $S_o$ for the first trajectory map data and second trajectory map data. Specifically, the formula of $S_o$ can be expressed as follows:

$$S_o = \frac{l_2}{l_1}.$$

A similarity transformation matrix $R_o$ for the first trajectory map data and the second trajectory map data can be obtained based on an angle $\theta_o$ between the line segments $l_1$ and $l_2$. The calculation formula of Ro can be expressed as follows.

More specifically, the calculation formula of $\theta_o$ can be expressed as follows:

$$\theta_o = \tan^{-1}\frac{y_2^o}{x_2^o} - \tan^{-1}\frac{y_1^o}{x_1^o};$$

$$R_o = \begin{pmatrix} \cos\theta_o & -\sin\theta_o \\ \sin\theta_o & \cos\theta_o \end{pmatrix}.$$

The relative initial translation vector is $t_o$, expressed as:

$$t_o[0\ 0]^T.$$

In implementation, the above step of interpolating the first trajectory map data and the second trajectory map data to thereby obtain data at preset interpolation points corresponding to the first trajectory map data and the second trajectory map data (i.e. corresponding interpolation point data) can include:

constructing a sliding window;

utilizing the sliding window to interpolate the first trajectory map data and the second trajectory map data to thereby obtain the data at the preset interpolation points corresponding to the first trajectory map data and the second trajectory map data.

In practice, in order to speed up the data processing and to improve the efficiency, a sliding window can be constructed. For example, a sliding window with a fixed time span $\Delta T$ can be selected according to the actual situation. Based on the sliding window with a time span $\Delta T$, the first trajectory map data and the second trajectory map data can be treated for interpolation to thereby obtain the corresponding interpolation point data.

In implementation, the above step of interpolating the first trajectory map data and the second trajectory map data to thereby obtain data at preset interpolation points corresponding to the first trajectory map data and the second trajectory map data (i.e. corresponding interpolation point data) can optionally include:

calculating a mean variance of the first trajectory map data and of the second trajectory map data, respectively;

querying a chi-square distribution table based on the mean variance and a preset probability to thereby obtain a corresponding degree of freedom;

setting a maximum value among a data number of the first trajectory map data, a data number of the second trajectory map data, and the degree of freedom as a target number of interpolation points;

interpolating the first trajectory map data and the second trajectory map data respectively by means of an interpolation function based on the target number of interpolation points to thereby obtain the data at the preset interpolation points corresponding to the first trajectory map data and the second trajectory map data at a same time.

Figure 5:
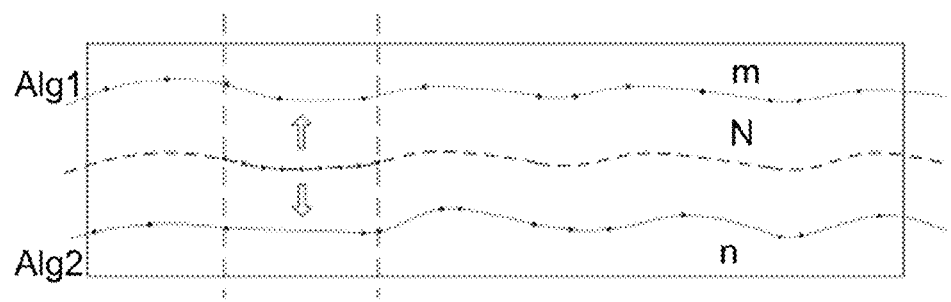
FIG. 5 is a second diagram illustrating a cloud-based trajectory map generation method according to some embodiments of the disclosure.

FIG. 5 shows a second diagram illustrating the cloud-based trajectory map generation method according to the above embodiments of the disclosure. As shown in FIG. 5, Alg1 illustrates the first trajectory map data, and Alg2 illustrates the second trajectory map data. Herein the selected time span of the fixed sliding window is $\Delta T$. Within the sliding window $\Delta T$, the number of the Alg1 posture data is m, and the number of Alg2 posture data is n. The mean variance of the m posture data in Alg1 and the mean variance of the n posture data in Alg2 are calculated respectively. Based on a preset probability, such as 0.75 or 0.9, the degree of freedom $\delta$ can be obtained by querying a chi-square distribution table. The maximum value of m, n and $\delta$ is selected as the number of interpolation points N in the interpolation process, and N is expressed in the following formula: N=max (m, n, $\delta$).

The above step can be implemented as follows:

a. fixing a time span $\Delta T$ of a sliding window, and within $\Delta T$, there are m posture data in Alg1 and n posture data in Alg2. Then a second-order matrix of the x and y coordinates of Alg1 and Alg2: i.e. $\mu_{1x}^2$, $\mu_{2x}^2$, $\mu_{2x}^2$ and $\mu_{2y}^2$ are calculated, respectively, to thereby obtain a final $\mu^2$ of the above two matrices, expressed as follows:

$$\mu_{1x}^2 = E[(x_1 - E(x_1))^2];$$

$$\mu_{1y}^2 = E[(y_1 - E(y_1))^2];$$

$$\mu_{2x}^2 = E[(x_2 - E(x_2))^2];$$

$$\mu_{2y}^2 = E[(y_2 - E(y_2))^2];$$

$$\mu_1^2 = \tfrac{1}{2}(\mu_{1x}^2 + \mu_{1y}^2);$$

$$\mu_2^2 = \tfrac{1}{2}(\mu_{2x}^2 + \mu_{2y}^2);$$

$$\mu^2 = \max(\mu_1^2, \mu_2^2);$$

Herein, $\mu^2$ obeys a chi-square distribution. Then based on a preset or presupposed probability, such as 0.75 or 0.9, the degree of freedom $\delta$ can be obtained by looking up the chi-square distribution table. The maximum value of m, n and the calculated degree of freedom $\delta$ can be then selected as the number of interpolation points N, i.e., N=max (m, n, $\delta$). As such, the interval $\Delta t$ between every two adjacent interpolation points can be determined as:

$$\Delta t = \frac{\Delta T}{N}.$$

Then based on $\Delta t$, an interpolation processing can be performed over the first trajectory map data and the second trajectory map data respectively, to thereby obtain the interpolation point data at the preset interpolation points at a same time corresponding to the first trajectory map data and the second trajectory map data.

In implementation, the step of determining a residual equation based on the corresponding interpolation point data and the initial value of the transformation relationship, and obtaining an optimal solution of the transformation relationship based on the residual equation can include:

determining, based on the interpolation point data within the first trajectory map data in the corresponding interpolation point data and the initial value of the transformation relationship, an estimated interpolation point data within the second trajectory map data by transformation from the interpolation point data within the first trajectory map data, wherein an offset error between the estimated interpolation point data and the real value obeys a Gauss distribution;

obtaining, based on the estimated interpolation point data within the second trajectory map data and the corresponding interpolation point data within the second trajectory map data, the residual equation; and calculating, based on the residual equation, an optimal solution of the transformation relationship;

Alternatively, the step can include:

determining, based on the interpolation point data within the second trajectory map data in the corresponding interpolation point data and the initial value of the transformation relationship, an estimated interpolation point data within the first trajectory map data by transformation from the interpolation point data within the second trajectory map data, wherein an offset error between the estimated interpolation point data and the real value obeys a Gauss distribution;

obtaining, based on the estimated interpolation point data within the first trajectory map data and the corresponding interpolation point data within the first trajectory map data, the residual equation; and calculating, based on the residual equation, an optimal solution of the transformation relationship.

A residual in mathematical statistics is referred to as a difference between an observed value and an estimated value (i.e. fitted value). In practice, a map transformation is a type of similarity transformation with an offset error. The offset error B obeys the Gauss distribution. Tv represents the posture (i.e. position and attitude) data in Alg1, and To represents the posture data in Alg2. $T_{v,tk}$ and $T_{o,tk}$ are obtained by interpolating Alg1 and Alg2 respectively. After interpolation, the time axes tk of interpolated Alg1 and Alg2 correspond to each other synchronously. That is, at each moment tk, the posture data $T_{v,tk}$ and $T_{o,tk}$ can be respectively found at the Alg1 trajectory and at the Alg2 trajectory. Herein, $T_{v,tk}$ and $T_{o,tk}$, as well as the offset error B, can be calculated as follows:

$$T_{v,tk} = \begin{pmatrix} R_{v,tk} & t_{v,tk} \\ 0 & 1 \end{pmatrix};$$

$$T_{v,tk} = \begin{pmatrix} R_{o,tk} & t_{o,tk} \\ 0 & 1 \end{pmatrix};$$

$$B = \begin{pmatrix} 0 & t_b \\ 0 & 1 \end{pmatrix};$$

$$t_b = \begin{pmatrix} t_b^1 \\ t_b^2 \end{pmatrix}.$$

Herein, $t^1_b$ and $t^2_b$ obey the Gauss distribution of zero mean.

The transformation relationship $T_{o2v}$ between the first trajectory map data and the second trajectory map data to be optimized in the sliding window is expressed as follows:

$$T_{o2v} = \begin{pmatrix} sR_{o2v} & t_{o2v} \\ 0 & 1 \end{pmatrix}.$$

Based on $T_{o2v}$, the corresponding relationship between the interpolation point data corresponding to the first trajectory map data and the second trajectory map data in the sliding window can be obtained. It is expressed as follows:

$$T_{v,tk} = T_{o2v} \cdot T_{o,tk} + B.$$

Further based on the above formula, the residual equation is expressed as follows:

$$\text{Residual} = T_{v,tk} - (T_{o2v} \cdot T_{o,tk} + B).$$

The residual is the cost value in optimization theory. The smaller the cost value, the more accurate the parameter $T_{o2v}$ to be solved. Then, the optimal solution $T_{o2v}$ can be obtained.

For areas with obvious fluctuations, such as the presence of stairs in a trajectory map, a 2D trajectory map has its limitations, and a 3D trajectory map is needed. Regarding the fusion and optimization of a 3D trajectory map, the method and the steps as mentioned above are also needed. The difference is that the degree of freedom for the rotation matrix and the translation vector increases from 2D to 3D. Therefore, appropriate improvements are needed in the initial alignment of the trajectory map, but the steps for interpolation and for optimization are similar, and it only needs to increase corresponding degree of freedom, which will not be repeated herein.

In practice, the step of generating a trajectory map based on the optimal solution of the transformation relationship can include:

obtaining, based on the optimal solution of the transformation relationship and the interpolation point data within the first trajectory map data in the corresponding interpolation point data, optimal estimated interpolation point data within the second trajectory map data by transformation from the interpolation point data within the first trajectory map data;

fitting the optimal estimated interpolation point data within the second trajectory map data and the corresponding interpolation point data within the second trajectory map data, to thereby generate the trajectory map.

Alternatively, the above step can include:

obtaining, based on the optimal solution of the transformation relationship and the interpolation point data within the second trajectory map data in the corresponding interpolation point data, optimal estimated interpolation point data within the first trajectory map data by transformation from the interpolation point data within the second trajectory map data;

fitting the optimal estimated interpolation point data within the first trajectory map data and the corresponding interpolation point data within the first trajectory map data, to thereby generate the trajectory map.

Specifically, as shown in FIG. 4, after obtaining the optimal solution of $T_{o2v}$, then based on the optimal solution of the transformation relationship and the interpolation point data within the first trajectory map data, an optimal estimated interpolation point data within the second trajectory map data can be obtained by transformation from the interpolation point data within the first trajectory map data. Then the optimal estimated interpolation point data within the second trajectory map data and the corresponding interpolation point data within the second trajectory map data can be fitted. After a certain number of fitting is completed, a trajectory map can be generated.

Herein, there is no limitation to the specific fitting algorithm, and a person of ordinary skill in the art can flexibly pick a fitting algorithm according to actual situation.

Similarly, based on the optimal solution of the transformation relationship and the interpolation point data within the second trajectory map data, an optimal estimated interpolation point data within the first trajectory map data can be obtained by transformation from the interpolation point data within the second trajectory map data. Then the optimal estimated interpolation point data within the first trajectory map data and the corresponding interpolation point data within the first trajectory map data can be fitted. After a certain number of fitting is completed, a trajectory map can be generated.

In implementation, the cloud-based trajectory map generation method can further include, after generating the trajectory map based on the optimal solution of the transformation relationship, regarding the generated trajectory map as third trajectory map data;

acquiring fourth trajectory map data;

performing a map-initializing treatment to align the third trajectory map data and the fourth trajectory map data to thereby obtain an initial value of a transformation relationship between the third trajectory map data and the fourth trajectory map data;

interpolating the third trajectory map data and the fourth trajectory map data to thereby obtain data at preset interpolation points corresponding to the third trajectory map data and the fourth trajectory map data (i.e. corresponding interpolation point data);

determining a residual equation based on the corresponding interpolation point data and the initial value of the transformation relationship, and obtaining an optimal solution of the transformation relationship based on the residual equation; and generating a trajectory map based on the optimal solution of the transformation relationship.

In practice, the fourth trajectory map data can be the trajectory map data that are originally collected, or can be similar to the third trajectory map data, i.e. can be trajectory map data obtained after the fitting of two or more original collected trajectory map data based on the cloud-based trajectory map generation method disclosed above.

Based on the same inventive concept, embodiments of the present disclosure further provide a cloud-based trajectory map generation device. Since the principle of the device is similar to the cloud-based trajectory map generation method as described above, the implementation of the device can reference to the implementation of the method, and the repeating part is skipped herein.

Figure 2:
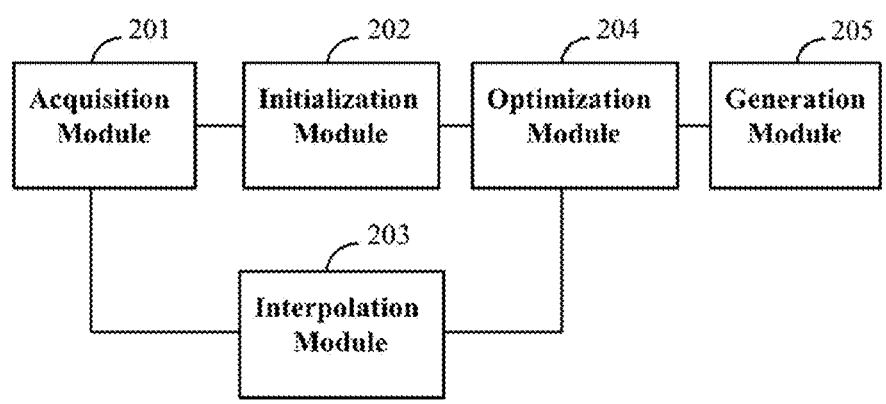
FIG. 2 illustrates a schematic diagram of the structure of a cloud-based trajectory map generation device according to some embodiments of the disclosure.

FIG. 2 illustrates a schematic diagram of the structure of a cloud-based trajectory map generation device according to some embodiments of the disclosure. As shown in FIG. 2, the cloud-based trajectory map generation device comprises:

an acquisition module 201, configured to acquire first trajectory map data and second trajectory map data, wherein the first trajectory map data and the second trajectory map data are obtained using two different mapping schemes over a same moving trajectory, or using a same mapping scheme over two substantially same moving trajectories, within a same region;

an initialization module 202, configured to perform a map-initializing treatment to align the first trajectory map data and the second trajectory map data to thereby obtain an initial value of a transformation relationship therebetween;

an interpolation module 203, configured to interpolate the first trajectory map data and the second trajectory map data to thereby obtain data at preset interpolation points corresponding to the first trajectory map data and the second trajectory map data (i.e. corresponding interpolation point data);

an optimization module 204, configured to determine a residual equation based on the corresponding interpolation data and the initial value of the transformation relationship, and to obtain an optimal solution of the transformation relationship based on the residual equation; and a generation module 205, configured to generate a trajectory map based on the optimal solution of the transformation relationship.

In implementation, the initialization module 202 can be specifically configured to obtain data corresponding to at least two preset position points from each of the first trajectory map data and the second trajectory map data; to obtain a relative initial translation vector of the first trajectory map data and the second trajectory map data based on any one of the at least two position points; to draw connection lines connecting two of the at least two position points; to obtain a relative scaling factor for the first trajectory map data and the second trajectory map data based on a length ratio between the connection line corresponding to the first trajectory map data and the connection line corresponding to the second trajectory map data; and to obtain a similarity transformation matrix for the first trajectory map data and the second trajectory map data based on an angle between the connection lines. Herein, the transformation relationship includes a relative scaling factor, a relative initial translation vector, or a similarity transformation matrix.

In implementation, the interpolation module 203 can be specifically configured to construct a sliding window, and then to utilize the sliding window to interpolate the first trajectory map data and the second trajectory map data to thereby obtain the data at the preset interpolation points corresponding to the first trajectory map data and the second trajectory map data.

In implementation, the interpolation module 203 can be configured to calculate a mean variance of the first trajectory map data and of the second trajectory map data, respectively; to query a chi-square distribution table based on the mean variance and a preset probability to thereby obtain a corresponding degree of freedom; to set a maximum value among a data number of the first trajectory map data, a data number of the second trajectory map data, and the degree of freedom as a target number of interpolation points; to interpolate the first trajectory map data and the second trajectory map data respectively by means of an interpolation function based on the target number of interpolation points to thereby obtain the data at the preset interpolation points corresponding to the first trajectory map data and the second trajectory map data at a same time.

In implementation, the optimization module 204 can be specifically configured to determine, based on the interpolation point data within the first trajectory map data in the corresponding interpolation point data and the initial value of the transformation relationship, an estimated interpolation point data within the second trajectory map data by transformation from the interpolation point data within the first trajectory map data, wherein an offset error between the estimated interpolation point data and the real value obeys a Gauss distribution; to obtain, based on the estimated interpolation point data within the second trajectory map data and the corresponding interpolation point data within the second trajectory map data, the residual equation; and then to calculate, based on the residual equation, an optimal solution of the transformation relationship.

Alternatively, the optimization module 204 can be specifically configured to determine, based on the interpolation point data within the second trajectory map data in the corresponding interpolation point data and the initial value of the transformation relationship, an estimated interpolation point data within the first trajectory map data by transformation from the interpolation point data within the second trajectory map data, wherein an offset error between the estimated interpolation point data and the real value obeys a Gauss distribution; to obtain, based on the estimated interpolation point data within the first trajectory map data and the corresponding interpolation point data within the first trajectory map data, the residual equation; and to calculate, based on the residual equation, an optimal solution of the transformation relationship.

In implementation, the generation module 205 can be specifically configured to obtain, based on the optimal solution of the transformation relationship and the interpolation point data within the first trajectory map data in the corresponding interpolation point data, an optimal estimated interpolation point data within the second trajectory map data by transformation from the interpolation point data within the first trajectory map data; and to fit the optimal estimated interpolation point data within the second trajectory map data and the corresponding interpolation point data within the second trajectory map data, to thereby generate the trajectory map.

Alternatively, the generation module 205 can be specifically configured to obtain, based on the optimal solution of the transformation relationship and the interpolation point data within the second trajectory map data in the corresponding interpolation point data, an optimal estimated interpolation point data within the first trajectory map data by transformation from the interpolation point data within the second trajectory map data; and to fit the optimal estimated interpolation point data within the first trajectory map data and the corresponding interpolation point data within the first trajectory map data, to thereby generate the trajectory map.

In implementation, the cloud-based trajectory map generation device can further comprise a data module, configured, after generating the trajectory map based on the optimal solution of the transformation relationship, use the generated trajectory map as third trajectory map data.

The acquisition module is further configured to acquire fourth trajectory map data.

The initialization module is further configured to perform a map-initializing treatment to align the third trajectory map data and the fourth trajectory map data to thereby obtain an initial value of a transformation relationship between the third trajectory map data and the fourth trajectory map data;

The interpolation module is further configured to interpolate the third trajectory map data and the fourth trajectory map data to thereby obtain data at preset interpolation points corresponding to the third trajectory map data and the fourth trajectory map data (i.e. corresponding interpolation point data);

The optimization module is further configured to determine a residual equation based on the corresponding interpolation point data and the initial value of the transformation relationship, and to obtain an optimal solution of the transformation relationship based on the residual equation; and The generation module is further configured to generate a trajectory map based on the optimal solution of the transformation relationship.

Figure 3:
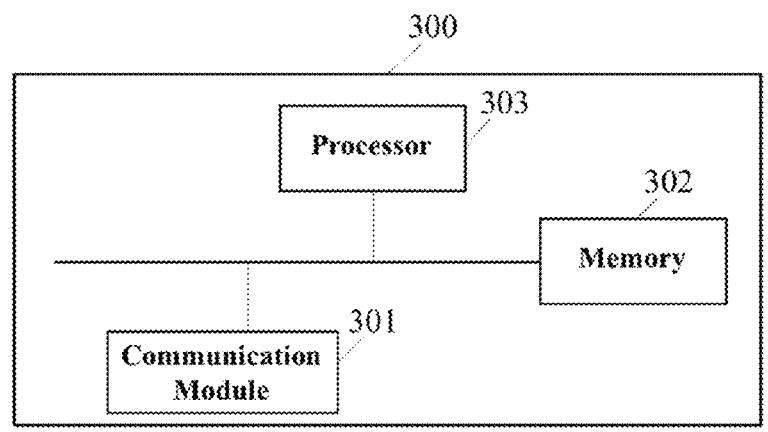
FIG. 3 illustrates a schematic diagram of the structure of a cloud-based trajectory map generation apparatus according to some embodiments of the disclosure.

Based on the same invention concept, an apparatus based on cloud is also provided in the embodiments of this application. FIG. 3 is a schematic diagram of the structure of a cloud-based electronic apparatus according to some embodiments of the disclosure. As shown in FIG. 3, the cloud-based electronic apparatus 300 includes: a communication module 301, a memory 302, one or more processors 303, and one or more modules. The one or more modules are stored in the memory and are configured to be executed by the one or more processors. Herein the one or more modules comprise instructions for executing each step of the above cloud-based trajectory map generation method.

Based on the same inventive concept, embodiments of the present application further provide an application used in combination with the above cloud-based electronic apparatus, the application includes a computer program embedded in a computer-readable storage medium, and the computer program comprises instructions for executing the cloud-based electronic apparatus.

Embodiment 1

Figure 6:
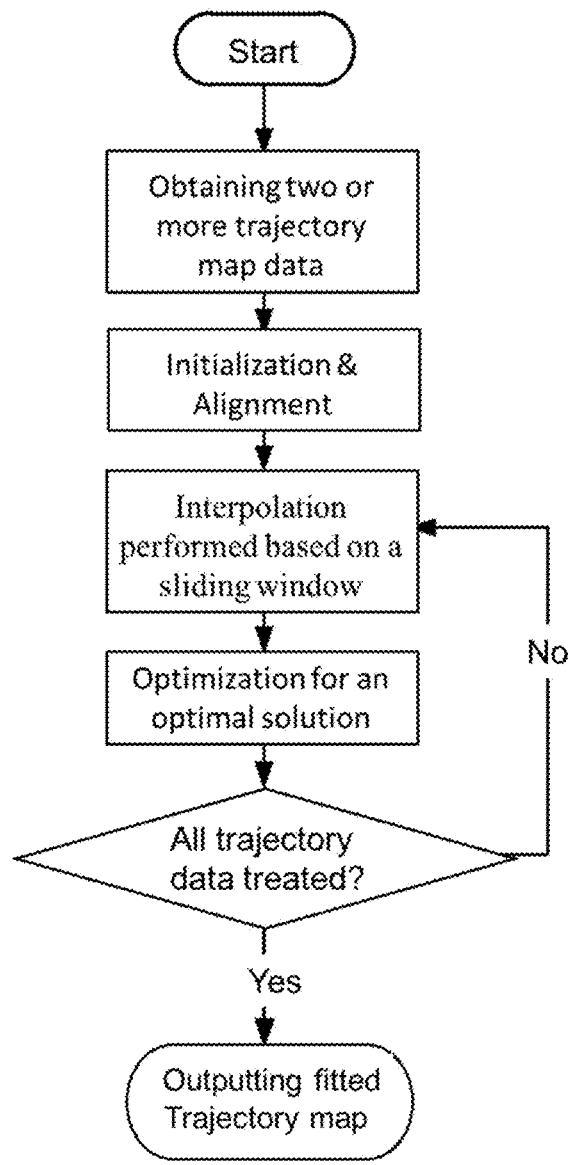
FIG. 6 is a third diagram illustrating a cloud-based trajectory map generation method according to some embodiments of the disclosure.

FIG. 6 is a third diagram illustrating a cloud-based trajectory map generation method according to some embodiments of the disclosure. As shown in FIG. 6, the implementation of the method according to this embodiment of the disclosure includes the following steps. Firstly, two or more trajectory map data are obtained. Herein the higher sample number of the trajectory map data, the higher resolution of the finally optimized trajectory map. Then, the trajectory map data are initialized and aligned for every two trajectory map data. Next, an interpolation process is performed based on a sliding window. Then next, an optimization process in order to obtain an optimal solution as described above is performed. If all of the trajectory map data has been processed, a trajectory map generated by fitting can be ultimately output, or otherwise, the processing will continue. Examples are provided below.

1) Fusion of a monocular SLAM map and a VIO map: a monocular SLAM has no real scale, whereas a VIO has real scale due to the introduction of IMU. The trajectory map data for these two schemes are similar, and differ by a scale. Using the technologies disclosed in this application, a monocular map can be corrected to have a real scale, and an error between the two maps can be reduced, in turn mitigating the impact of an IMU drift or an insufficient excitation on the outcomes.

Because both the VIO map and binocular SLAM map have real scales, the specific algorithms under this scenario are substantially same as those above.

2) Fusion of a binocular SLAM map and a binocular SLAM map: for the fusion of binocular SLAM maps, because they both have real scales, the main issues are the errors caused by a baseline distance and the influence of random noise, and the noise interference can be reduced by the method disclosed herein.

The specific algorithms under this scenario is substantially same as the above, except that the correction ratio is very small when the map is initialized and aligned.

3) Fusion of a binocular SLAM map and a VIO map: Both a binocular SLAM map and a VIO map have real scales. The main issues are the errors caused by IMU drift and inadequate excitation of some axes and the errors caused by binocular baselines. The method disclosed herein can compensate the errors caused by IMU, thus reducing the errors.

The specific algorithms under this scenario is substantially same as the above, except that the correction ratio is very small when the map is initialized and aligned.

The cloud-based trajectory map generation method provided in the embodiments of this disclosure can be optimized based on multiple trajectory map data to thereby generate more accurate maps.

Person of ordinary skill in the field shall understand that embodiments of this disclosure can be provided as a method, a system, or an application program. As such, the present disclosure may take the form of an all-hardware embodiment, an all-software embodiment, or an embodiment combining both software and hardware. Furthermore, the disclosure may also be in the form of an application program to be executed on one or more computer-compatible storage media (including, but not limited to, disk memory, compact disc-read only memory (CD-ROM), optical storage, etc.) containing computer-compatible codes or instructions.

The present disclosure is described with reference to a method, a device (system), and flow charts and/or block diagrams of an application program according to the embodiments of the present disclosure. It should be understood that each process in a flowchart and/or each block in a block diagram, and a combination of process(es) in a flowchart and/or block(s) in a block diagram, can be implemented by means of computer program instructions. These computer program instructions can be provided to processors of a general-purpose computer, a special-purpose computer, an embedded processing device, or another programmable data processing device to generate a machine that generates instructions executed by the processors of the computers or other programmable data processing devices in order to implement one or more processes in the flowchart, or to realize the function specified by one or more blocks in the block diagram.

These computer program instructions may also be stored in a computer-readable memory that may guide a computer or other programmable data processing device to work in a specific way, so that the instructions stored in the computer-readable memory can produce a manufacture including an instruction device, which can be implemented to realize one or more flow charts and/or the function specified by one or more block diagrams.

These computer program instructions can also be loaded on a computer or other programmable data processing device, enabling a series of operational steps to be performed on the computer or the other programmable device to generate a computer-implemented processing, thereby providing instructions to be executed on a computer or other programmable device for implementing one or more flow charts and/or the function specified by one or more block diagrams.

Although preferred embodiments of the present disclosure have been described, once person of ordinary skill in the art have learned the basic creative concepts, they may make additional changes and modifications to these embodiments. Therefore, the appended claims are intended to be interpreted as including preferred embodiments and all changes and modifications that fall within the scope of this disclosure.

The invention claimed is:

1. A method for generating a trajectory map, comprising:
    collecting first trajectory map data and second trajectory map data by a data acquisition device, wherein the first trajectory map data and the second trajectory map data are collected using two different mapping schemes over a same moving trajectory within a same region, or using a same mapping scheme over two substantially identical moving trajectories within a same region;
    obtaining, by a cloud-based electronic apparatus, an initial value of a transformation relationship between the first trajectory map data and the second trajectory map data by performing a map-initializing treatment to align the first trajectory map data and the second trajectory map data;
    obtaining, by the cloud-based electronic apparatus, preset interpolation point data corresponding to the same time in the first trajectory map data and the second trajectory map data by interpolating the first trajectory map data and the second trajectory map data;
    obtaining, by the cloud-based electronic apparatus, an optimal solution of the transformation relationship based on a residual equation determined based on the preset interpolation point data and the initial value of the transformation relationship, wherein the residual equation indicates a difference between an estimated interpolation point data within the second trajectory map data and corresponding interpolation point data within the second trajectory map data or indicates a difference between an estimated interpolation point data within the first trajectory map data and corresponding interpolation point data within the first trajectory map data; and
    generating and outputting, by the cloud-based electronic apparatus, the trajectory map based on the optimal solution of the transformation relationship, wherein the trajectory map is applied to obstacle avoidance and/or blindness guidance.

2. The method of claim 1, wherein obtaining, by the cloud-based electronic apparatus, an initial value of a transformation relationship between the first trajectory map data and the second trajectory map data by performing a map-initializing treatment to align the first trajectory map data and the second trajectory map data comprises:
    obtaining, by the cloud-based electronic apparatus, data corresponding to at least two preset position points from each of the first trajectory map data and the second trajectory map data;
    obtaining, by the cloud-based electronic apparatus, a relative initial translation vector of the first trajectory map data and the second trajectory map data based on any one of the at least two position points;
    obtaining, by the cloud-based electronic apparatus, a connection line corresponding to the first trajectory map data and a connection line corresponding to the second trajectory map data by drawing connection lines connecting two of the at least two position points;
    obtaining, by the cloud-based electronic apparatus, a relative scaling factor for the first trajectory map data and the second trajectory map data based on a length ratio between the connection line corresponding to the first trajectory map data and the connection line corresponding to the second trajectory map data;
    obtaining, by the cloud-based electronic apparatus, a similarity transformation matrix for the first trajectory map data and the second trajectory map data based on an angle between the connection lines;
    the transformation relationship comprises the relative scaling factor, the relative initial translation vector, or the similarity transformation matrix.

3. The method of claim 1, wherein obtaining, by the cloud-based electronic apparatus, preset interpolation point data corresponding to the same time in the first trajectory map data and the second trajectory map data by interpolating the first trajectory map data and the second trajectory map data comprises:
    constructing, by the cloud-based electronic apparatus, a sliding window;
    obtaining, by the cloud-based electronic apparatus, the preset interpolation point data corresponding to the same time in the first trajectory map data and the second trajectory map data by utilizing the sliding window to interpolate the first trajectory map data and the second trajectory map data.

4. The method of claim 1, wherein obtaining, by the cloud-based electronic apparatus, preset interpolation point data corresponding to the same time in the first trajectory map data and the second trajectory map data by interpolating the first trajectory map data and the second trajectory map data comprises:

calculating, by the cloud-based electronic apparatus, a mean variance of the first trajectory map data and of the second trajectory map data, respectively;

obtaining, by the cloud-based electronic apparatus, a corresponding degree of freedom by querying a chi-square distribution table based on the mean variance and a preset probability;

setting, by the cloud-based electronic apparatus, a maximum value among a data number of the first trajectory map data, a data number of the second trajectory map data, and the degree of freedom as a target number of interpolation points;

obtaining, by the cloud-based electronic apparatus, preset interpolation point data corresponding to the same time in the first trajectory map data and the second trajectory map data by interpolating the first trajectory map data and the second trajectory map data respectively by means of an interpolation function based on the target number of interpolation points.

5. The method of claim 4, wherein obtaining, by the cloud-based electronic apparatus, an optimal solution of the transformation relationship based on a residual equation determined based on the preset interpolation point data and the initial value of the transformation relationship comprises:

determining, based on interpolation point data within the first trajectory map data in the data at the preset interpolation point data and the initial value of the transformation relationship, estimated interpolation point data within the second trajectory map data by transformation from the interpolation point data within the first trajectory map data by the cloud-based electronic apparatus, wherein an offset error between the estimated interpolation point data and interpolation point data within the second trajectory map data obeys a Gauss distribution;

obtaining, based on the estimated interpolation point data within the second trajectory map data and the interpolation point data within the second trajectory map data, the residual equation by the cloud-based electronic apparatus; and calculating, based on the residual equation, the optimal solution of the transformation relationship by the cloud-based electronic apparatus;

or determining, based on interpolation point data within the second trajectory map data in the data at the preset interpolation points and the initial value of the transformation relationship, estimated interpolation point data within the first trajectory map data by transformation from the interpolation point data within the second trajectory map data by the cloud-based electronic apparatus, wherein an offset error between the estimated interpolation point data and the interpolation point data within the first trajectory map data obeys a Gauss distribution;

obtaining, based on the estimated interpolation point data within the first trajectory map data and the corresponding interpolation point data within the first trajectory map data, the residual equation by the cloud-based electronic apparatus; and calculating, based on the residual equation, the optimal solution of the transformation relationship by the cloud-based electronic apparatus.

6. The method of claim 5, wherein generating and outputting, by the cloud-based electronic apparatus, the trajectory map based on the optimal solution of the transformation relationship comprises:

obtaining, based on the optimal solution of the transformation relationship and the interpolation point data within the first trajectory map data in the data at the preset interpolation points, optimal estimated interpolation point data within the second trajectory map data by transformation from the interpolation point data within the first trajectory map data by the cloud-based electronic apparatus;

generating and outputting, by the cloud-based electronic apparatus, the trajectory map by fitting the optimal estimated interpolation point data within the second trajectory map data and the interpolation point data within the second trajectory map data;

or obtaining, based on the optimal solution of the transformation relationship and the interpolation point data within the second trajectory map data in the corresponding interpolation point data, optimal estimated interpolation point data within the first trajectory map data by transformation from the interpolation point data within the second trajectory map data by the cloud-based electronic apparatus;

generating and outputting, by the cloud-based electronic apparatus, the trajectory map by fitting the optimal estimated interpolation point data within the first trajectory map data and the interpolation point data within the first trajectory map data.

7. The method of claim 1, further comprising, after the generating the trajectory map based on the optimal solution of the transformation relationship:

regarding, by the cloud-based electronic apparatus, the trajectory map as third trajectory map data;

acquiring, by the cloud-based electronic apparatus, fourth trajectory map data;

obtaining, by the cloud-based electronic apparatus, a second initial value of a second transformation relationship between the third trajectory map data and the fourth trajectory map data by performing a map-initializing treatment to align the third trajectory map data and the fourth trajectory map data and obtaining, by the cloud-based electronic apparatus, a preset second interpolation point data corresponding to the same time in the third trajectory map data and the fourth trajectory map data by interpolating the third trajectory map data and the fourth trajectory map data;

obtaining, by the cloud-based electronic apparatus, a second optimal solution of the second transformation relationship based on a residual equation determined based on the preset second interpolation point data and the second initial value of the second transformation relationship; and generating and outputting, by the cloud-based electronic apparatus, a second trajectory map based on the second optimal solution of the second transformation relationship.

8. The method of claim 1, wherein obtaining an initial value of a transformation relationship between the first trajectory map data and the second trajectory map data by aligning the first trajectory map data and the second trajectory map data and obtaining preset interpolation point data corresponding to the first trajectory map data and the second trajectory map data by interpolating the first trajectory map data and the second trajectory map data comprises, in a sequential, inversely sequential, or simultaneous manner:
    obtaining an initial value of a transformation relationship between the first trajectory map data and the second trajectory map data by aligning the first trajectory map data and the second trajectory map data; and
    obtaining preset interpolation point data corresponding to the first trajectory map data and the second trajectory map data by interpolating the first trajectory map data and the second trajectory map data.

9. The method of claim 1, wherein the two different mapping schemes comprise:
    a monocular simultaneous localization and mapping (SLAM) mapping scheme and a visual-inertial odometry (VIO) mapping scheme; or
    a binocular SLAM mapping scheme and a VIO mapping scheme.

10. The method of claim 1, wherein the same mapping scheme is a binocular simultaneous localization and mapping (SLAM) mapping scheme.

11. The method of claim 1, wherein the method is based on a cloud.

12. A device for generating a trajectory map, applied to a cloud-based electronic apparatus, comprising:
    a processor; and
    a memory storing instructions, which, when executed by the processor, cause the processor to:
        collect first trajectory map data and second trajectory map data collected by a data acquisition device, wherein the first trajectory map data and the second trajectory map data are obtained using two different mapping schemes over a same moving trajectory within a same region, or using a same mapping scheme over two substantially same moving trajectories, within a same region;
        obtain an initial value of a transformation relationship therebetween by performing a map-initializing treatment to align the first trajectory map data and the second trajectory map data;
        obtain preset interpolation point data corresponding to the same time in the first trajectory map data and the second trajectory map data by interpolating the first trajectory map data and the second trajectory map data;
        obtain an optimal solution of the transformation relationship based on a residual equation determined based on the preset interpolation point data and the initial value of the transformation relationship, wherein the residual equation indicates a difference between an estimated interpolation point data within the second trajectory map data and corresponding interpolation point data within the second trajectory map data or indicates a difference between an estimated interpolation point data within the first trajectory map data and corresponding interpolation point data within the first trajectory map data; and
        generate and output the trajectory map based on the optimal solution of the transformation relationship, wherein the trajectory map is applied to obstacle avoidance and/or blindness guidance.

13. The device of claim 12, wherein the processor is configured to:
    obtain data corresponding to at least two preset position points from each of the first trajectory map data and the second trajectory map data;
    obtain a relative initial translation vector of the first trajectory map data and the second trajectory map data based on any one of the at least two position points;
    obtain a connection line corresponding to the first trajectory map data and a connection line corresponding to the second trajectory map data by drawing connection lines connecting two of the at least two position points;
    obtain a relative scaling factor for the first trajectory map data and the second trajectory map data based on a length ratio between the connection line corresponding to the first trajectory map data and the connection line corresponding to the second trajectory map data; and
    obtain a similarity transformation matrix for the first trajectory map data and the second trajectory map data based on an angle between the connection lines;
    wherein the transformation relationship comprises the relative scaling factor, the relative initial translation vector, or the similarity transformation matrix.

14. The device of claim 12, wherein the processor is configured to:
    construct a sliding window; and
    obtain the preset interpolation point data corresponding to the first trajectory map data and the second trajectory map data by utilizing the sliding window to interpolate the first trajectory map data and the second trajectory map data.

15. The device of claim 12, wherein the processor is configured to:
    calculate a mean variance of the first trajectory map data and of the second trajectory map data, respectively;
    obtain a corresponding degree of freedom by querying a chi-square distribution table based on the mean variance and a preset probability;
    set a maximum value among a data number of the first trajectory map data, a data number of the second trajectory map data, and the degree of freedom as a target number of interpolation points; and
    obtain the preset interpolation point data corresponding to the same time in the first trajectory map data and the second trajectory map data by interpolating the first trajectory map data and the second trajectory map data respectively by means of an interpolation function based on the target number of interpolation points.

16. The device of claim 12, wherein the processor is configured to:
    determine, based on interpolation point data within the first trajectory map data in the data at the preset interpolation point data and the initial value of the transformation relationship, estimated interpolation point data within the second trajectory map data by transformation from the interpolation point data within the first trajectory map data, wherein an offset error between the estimated interpolation point data and interpolation point data within the second trajectory map data obeys a Gauss distribution;
    obtain, based on the estimated interpolation point data within the second trajectory map data and the interpolation point data within the second trajectory map data, the residual equation; and
    calculate, based on the residual equation, the optimal solution of the transformation relationship;
or
    determine, based on interpolation point data within the second trajectory map data in the data at the preset interpolation points and the initial value of the transformation relationship, estimated interpolation point data within the first trajectory map data by transformation from the interpolation point data within the second trajectory map data, wherein an offset error between the estimated interpolation point data and the interpolation point data within the first trajectory map data obeys a Gauss distribution;

obtain, based on the estimated interpolation point data within the first trajectory map data and the corresponding interpolation point data within the first trajectory map data, the residual equation; and calculate, based on the residual equation, the optimal solution of the transformation relationship.

17. The device of claim 16, wherein the processor is configured to:

obtain, based on the optimal solution of the transformation relationship and the interpolation point data within the first trajectory map data in the data at the preset interpolation points, optimal estimated interpolation point data within the second trajectory map data by transformation from the interpolation point data within the first trajectory map data; and generate and output the trajectory map by fitting the optimal estimated interpolation point data within the second trajectory map data and the interpolation point data within the second trajectory map data;

or obtain, based on the optimal solution of the transformation relationship and the interpolation point data within the second trajectory map data in the corresponding interpolation point data, optimal estimated interpolation point data within the first trajectory map data by transformation from the interpolation point data within the second trajectory map data; and generate and output the trajectory map by fitting the optimal estimated interpolation point data within the first trajectory map data and the interpolation point data within the first trajectory map data.

18. The device of claim 12, the processor is further configured to regard the trajectory map as third trajectory map data, wherein:

the processor is further configured to acquire fourth trajectory map data;

the processor is further configured to obtain a second initial value of a second transformation relationship between the third trajectory map data and the fourth trajectory map data by performing a map-initializing treatment to align the third trajectory map data and the fourth trajectory map data;

the processor is further configured to obtain preset second interpolation point data corresponding to the third trajectory map data and the fourth trajectory map data by interpolating the third trajectory map data and the fourth trajectory map data;

the processor is further configured to obtain a second optimal solution of the second transformation relationship based on a second residual equation determined based on the preset second interpolation point data and the second initial value of the second transformation relationship; and the processor is further configured to generate and output a second trajectory map based on the second optimal solution of the second transformation relationship.

19. The device of claim 12, wherein the device is based on a cloud.

20. A non-transitory computer-readable storage medium, having computer program instructions stored thereon, wherein the program instructions, when being executed by a processor of a cloud-based electronic apparatus, are configured to perform the operations of:

first trajectory map data and second trajectory map data by a data acquisition device, wherein the first trajectory map data and the second trajectory map data are obtained using two different mapping schemes over a same moving trajectory within a same region, or using a same mapping scheme over two substantially identical moving trajectories within a same region;

obtaining an initial value of a transformation relationship between the first trajectory map data and the second trajectory map data by performing a map-initializing treatment to align the first trajectory map data and the second trajectory map data;

obtaining preset interpolation point data corresponding to the same time in the first trajectory map data and the second trajectory map data by interpolating the first trajectory map data and the second trajectory map data;

obtaining an optimal solution of the transformation relationship based on a residual equation determined based on the preset interpolation point data and the initial value of the transformation relationship, wherein the residual equation indicates a difference between an estimated interpolation point data within the second trajectory map data and corresponding interpolation point data within the second trajectory map data or indicates a difference between an estimated interpolation point data within the first trajectory map data and corresponding interpolation point data within the first trajectory map data; and generating and outputting the trajectory map based on the optimal solution of the transformation relationship, wherein the trajectory map is applied to obstacle avoidance and/or blindness guidance.

* * * * *